United States Patent [19]

Kinuta et al.

[11] Patent Number: 5,119,274
[45] Date of Patent: Jun. 2, 1992

[54] SOLID CAPACITOR

[75] Inventors: Kosei Kinuta, Uji; Isamu Ishikawa, Takatsuki; Nobuyuki Kume, Hirakata; Kenichi Hashizume, Kitagunma; Hideo Yamamoto, Shibukawa; Isao Isa, Gunma, all of Japan

[73] Assignees: Matsushita Electric Industrial Co., Ltd., Osaka; Japan Carlit Co., Ltd., Tokyo, both of Japan

[21] Appl. No.: 633,884

[22] Filed: Dec. 26, 1990

[30] Foreign Application Priority Data

Dec. 29, 1989 [JP] Japan .................................. 1-340733
Jul. 30, 1990 [JP] Japan .................................. 2-202182

[51] Int. Cl.$^5$ ............................................. H01G 9/00
[52] U.S. Cl. ..................................................... 361/525
[58] Field of Search ................ 361/323, 523, 524, 525, 361/527; 29/25.03

[56] References Cited

U.S. PATENT DOCUMENTS 3,793,060  2/1974  Weininger et al. ............. 361/305 X
3,869,652  3/1975  Maillot ................................. 361/323
4,231,076  10/1980  Markarian et al. ............ 361/512 X
4,731,695  3/1988  Brown et al. ......................... 361/323
4,768,130  8/1988  Bernard et al. ....................... 361/323
4,780,796  10/1988  Fukuda et al. ...................... 361/323
4,803,596  2/1989  Hellwig et al. ...................... 361/525
4,864,472  9/1989  Yoshimura et al. ................ 361/525
4,891,733  1/1990  Mammone ........................... 361/323

Primary Examiner—Donald Griffin
Attorney, Agent, or Firm—Panitch, Schwarze, Jacobs & Nadel

[57] ABSTRACT

A solid non-polar capacitor having excellent electrical characteristics such as high capacitance, which includes an electrode formed from a conductor having a porous surface, a dielectric layer formed from an insulating polymer thin film on the porous surface of the conductor, and a counter electrode formed from an electrically conductive layer on the surface of the dielectric layer. Preferably, the electrically conductive layer constituting the counter electrode consists of an electrically conductive polymer film prepared by chemical oxidation polymerization and an electrically conductive polymer layer prepared by electrolytic polymerization.

4 Claims, No Drawings

SOLID CAPACITOR

BACKGROUND OF THE INVENTION

1. Field of the Invention

This invention relates to a non-polar solid capacitor, and more particularly, it relates to a non-polar film capacitor having a layered structure in which an insulating polymer thin film as a dielectric is formed on the porous surface of a conductor and an electrically conductive layer as a counter electrode is formed on the insulating polymer thin film.

2. Description of the Prior Art

Conventional film capacitors are produced in such a manner that a polyester or polypropylene film as a dielectric is interposed between the metal electrodes such as aluminum foils and wound together, or alternatively, a metal thin film is deposited on one or both surfaces of the polyester or polypropylene film, followed by winding or layering of the composite film. In general, to obtain a film capacitor with high capacitance, a plastic film having a metal thin film deposited on one or both surfaces thereof is used in a wound or laminated form. However, the production of extremely thin plastic films has a limitation in an industrial scale. For this reason, it is difficult to obtain film capacitors with high capacitance, and film capacitors used for actual applications are therefore limited to capacitance of the order of several microfarads.

In the case of electrolytic capacitors using valve metals which can be readily anodized, such as aluminum or tantalum, large surface areas can be achieved by making the surface of these metals porous and then extremely thin dielectric oxide layers can be formed on the porous surface of the metals, thereby obtaining capacitors with high capacitance. However, dielectric oxide layers are fragile and therefore weak with respect to mechanical stresses applied in winding. Because numerous defects are present in the oxide films, the leakage current flowing through the capacitors becomes large. Furthermore, dielectric oxide layers formed from valve metals have a rectifying action and it is therefore difficult to produce non-polar capacitors by this method.

Because the use of a dielectric having a large surface area is preferred for the purpose of obtaining capacitors with high capacitance, the method in which the surface of a conductor as an electrode is made porous and a dielectric layer is formed on this surface may be considered. For example, a non-polar capacitor with high capacitance can be produced by forming an insulating polymer thin film as a dielectric on the porous surface of a conductor which has been treated to have an increased surface area, such as an etched aluminum foil. However, it is difficult to form an insulating polymer thin film which has a configuration corresponding to the surface irregularities of the conductor without filling the pores of the conductor having an increased surface area.

To give an example of dielectric materials, polyimide resins have excellent thermal resistance and excellent electrical characteristics and should therefore be regarded as a promising dielectric material for capacitors. However, it is difficult to obtain free-standing thin films from polyimide resins and solid capacitors using polyimide films have not yet been put to practical use. For the purpose of applying polyimide films as a dielectric, if a conductor which has been treated to have an increased surface area is first immersed in a solution containing polyamic acid so that the micropores of the conductor is filled with the solution, after which the polyamic acid is dehydrated to form a polyimide resin, then the micropores are filled with the polyimide resin and the surface of the conductor is made substantially flat. Because a polyimide film cannot have a configuration corresponding to the surface morphology of the conductor, the increased surface area of the conductor cannot be effectively utilized, and consequently the desired high capacitance cannot be obtained.

Even if an insulating polymer thin film could be formed on the porous surface of a conductor which has been treated to have an increased surface area, in such a manner as to have a configuration corresponding to the surface morphology of the conductor without filling the pores of the conductor, then a counter electrode layer in close contact with the insulating polymer thin film cannot be formed from a metal foil or deposited metal layer due to the similar porous state of the insulating polymer thin film, and consequently the desired high capacitance cannot also be obtained.

SUMMARY OF THE INVENTION

The solid capacitor of this invention, which overcomes the above-discussed and numerous other disadvantages and deficiencies of the prior art, comprises an electrode formed from a conductor having a porous surface, a dielectric layer formed from an insulating polymer thin film on the porous surface of the conductor, and a counter electrode formed from an electrically conductive layer on the surface of the dielectric layer.

In a preferred embodiment, the aforesaid insulating polymer thin film is a polyimide thin film formed by the use of a solution containing a salt of polyamic acid as an electrodepositing solution to form a thin film of polyamic acid on the porous surface of the conductor, after which the thin film of polyamic acid is dehydrated to a polyimide film.

In a preferred embodiment, the aforesaid electrically conductive layer consists of an electrically conductive polymer layer prepared by chemical oxidation polymerization and an electrically conductive polymer layer prepared by electrolytic polymerization.

In a preferred embodiment, the aforesaid electrically conductive polymer layer is made of polypyrrole.

Thus, the invention described herein makes possible the objectives of (1) providing a solid non-polar capacitor with excellent electrical characteristics such as a high withstand voltage and low dielectric losses, the capacitor being produced by first forming an insulating polymer thin film as a dielectric on the porous surface of a conductor which has been treated to have an increased surface area, in such a manner that the surface irregularities of the conductor are not removed and the insulating polymer thin film therefore has a configuration corresponding to the surface morphology of the conductor, and then forming a counter electrode on the insulating polymer thin film; (2) providing a solid non-polar capacitor with excellent electrical characteristics such as low dielectric losses and high capacitance comparable to that of conventional electrolytic capacitors, the capacitor being produced by first forming an insulating polymer thin film as a dielectric on the porous surface of a conductor which has been treated to have a large surface area, and then forming a counter electrode on the insulating polymer thin film in such a manner that an electrically conductive layer constituting the counter electrode comes in close contact with the insulating polymer thin film; and (3) providing a solid nonpolar capacitor with excellent electrical characteristics such as high withstand voltage and low dielectric losses, the capacitor being produced by first forming a polyimide thin film as a dielectric on the porous surface of a conductor which has been treated to have a large surface area, in such a manner that the surface irregularities of the conductor are not removed and the polyimide thin film therefore has a configuration corresponding to the surface morphology of the conductor and has a uniformity with extremely few defects, and then forming a counter electrode on the polyimide thin film.

DETAILED DESCRIPTION OF THE INVENTION

The solid capacitor of this invention has an electrode formed from a conductor having a porous surface, a dielectric layer formed from an insulating polymer thin film on the porous surface of the conductor, and a counter electrode formed from an electrically conductive layer on the surface of the dielectric layer.

As a material to form the conductor having a porous surface, aluminum, tantalum, titanium, nickel, stainless steel, copper, or carbon is preferably used from the viewpoint that the surface of these metals can be readily made porous and these metals have excellent electric conductivity and stability. Also, examples of the method for making the surface of a conductor porous include surface roughening by a chemical or physical technique such as electrochemical etching, chemical etching by the use of acids or alkalies, ion beam etching, and sputtering; or surface roughening by a mechanical technique such as sandblasting and grinding; or the formation of porous structures by sintering of electrically conductive fine powders. However, the conductors having a porous surface which can be used in the capacitor of this invention are not restricted to those prepared by the specific technique recited above.

In cases where a valve metal such as aluminum, tantalum, or titanium is used for the conductor having a porous surface, it is also possible to produce a composite dielectric by forming an insulating polymer thin film on the surface of the valve metal which has been made porous, and then forming an oxide layer of the valve metal by anodization on the portion of the insulating polymer thin film having poor withstand voltage characteristics. This may be one of the useful methods for improving the total withstand voltage of capacitors.

Examples of the method for forming an insulating polymer thin film on the porous surface of the conductor include a method in which a solution of polymers in a suitable solvent is impregnated into the conductor having a porous surface, after which the solvent is removed to form an insulating polymer thin film on the conductor; a method in which a prepolymer or polymer and a cross-linking agent are simultaneously or successively applicated onto the porous surface of the conductor, and then hardened by cross-linking reaction to form an insulating polymer thin film on the porous surface of the conductor; and a method in which an insulating polymer thin film is formed by vapor deposition on the porous surface of the conductor which is used as a substrate. More particularly, however, the following procedure is preferred for the purpose of forming an insulating polymer thin film on the porous surface of the conductor in such a manner that the insulating polymer thin film can have a configuration corresponding to the surface morphology of the conductor without removing the surface irregularities.

By the use of a conductor having a porous surface as an electrode, a vinyl compound (e.g., acrylic acid or styrene), p-xylene dichloride, polyisocyanate, benzene or their derivatives thereof can be electrolyzed to form an electrolytically polymerized film as an insulating polymer thin film on the porous surface of the conductor. Alternatively, an ionic polymer film can be first formed on the porous surface of the conductor by deposition from a solution of an ionic polymer such as a carboxylic acid-type resin or a polyamino-type resin by the use of the conductor as an electrode, and then hardened by heat treatment to form an insulating polymer thin film on the porous surface of the conductor.

In particular, a uniform polyimide thin film obtained in the following manner can be used as a dielectric with low dielectric losses and other excellent electrical characteristics; that is, by the use of the aforesaid conductor as an electrode and a solution containing a salt of polyamic acid as an electrodepositing solution, a thin film of polyamic acid is formed on the porous surface of the conductor and dehydrated to a uniform polyimide thin film.

Next, a preferred method of forming a polyimide film to be used as an insulating polymer thin film will be described below in further detail.

The salts of polyamic acid which can be used in the aforesaid electrodepositing process are obtained by first allowing a tetracarboxylic anhydride to react with a diamine to form a polyamic acid. Then, the product is dissolved in an organic solvent, and a base is added to neutralize all or part of the carboxyl groups of the polyamic acid.

The tetracarboxylic anhydrides which can be used are those known in the art and are not restricted to any specific type of anhydrides. For example, the following compounds of the formulae (1) to (6) can be used for the present purpose:

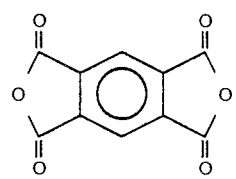
(1)

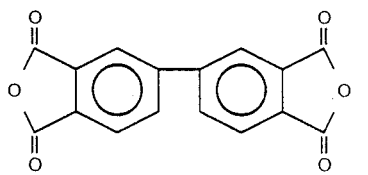
(2)

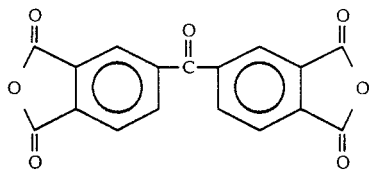
(3)

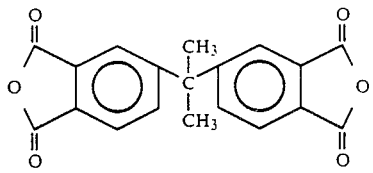
(4)

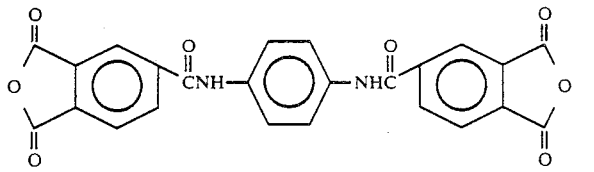
(5)

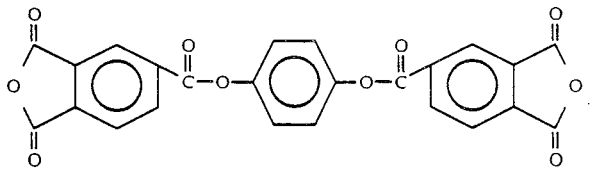
(6)

The diamines which can be used are those known in the art and are not restricted to any specific type of diamines. For example, the following compounds of the formulae (7) to (10) can be used for the present purpose:

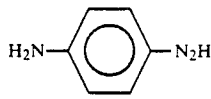
(7)

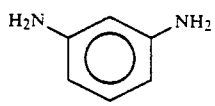
(8)

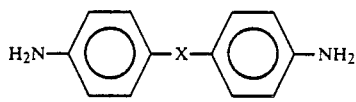
(9)

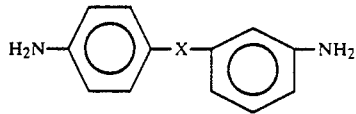
(10)

wherein X is O, $CH_2$, $SO_2$, $C(CH_3)_2$, or $C(CF_3)_2$.

Besides the diamines recited above, aliphatic diamines such as ethylenediamine and hexamethylenediamine can also be used for the present purpose.

The organic solvents which can be used are not restricted to any specific type of solvents, so long as the polyamic acid used is soluble therein. Particularly preferred are highly polar solvents such as N,N-dimethylacetamide, N,N-dimethylformamide, dimethoxyethane, N-methyl-2-pyrrolidone, N-methylcaprolactam, and dimethylsulfoxide.

Also, the bases which can be used are not restricted to any specific type of bases. Examples of the bases include inorganic hydroxides such as sodium hydroxide, basic salts such as sodium carbonate, alkylamines such as trimethylamine and triethylamine, and nitrogen-containing heterocyclic aromatic compounds such as pyridine, quinoline, and isoquinoline.

The solution of a salt of polyamic acid prepared in the manner described above may be used directly as an electrodepositing solution without further modification. Alternatively, a poor solvent with respect to polyamic acid may be added to this solution in an appropriate amount to prepare an electrodepositing solution. The kind of poor solvents to be used will vary according to the variety of polyamic acid used. The poor solvents which can be used include alcohols such as methanol, ethanol, ethylene glycol, propylene glycol, and glycerol; ketones such as acetone, methyl ethyl ketone, and cyclohexanone; aromatic hydrocarbons such as benzene, toluene, and xylene; chloroorganic compounds such as carbon tetrachloride and chloroform; and nitroalkanes such as nitromethane and nitroethane.

Next, in order to form a thin film of polyamic acid on the porous surface of the conductor, the conductor is immersed as an anode in the aforesaid electrodepositing solution, and electrodeposition is performed with a voltage of 1 to 300 V applied between the conductor and the external cathode. After being formed on the porous surface of the conductor in this manner, the thin film of polyamic acid is dehydrated to form the desired polyimide film. The hardening of the film is achieved by thermal dehydration treatment or by a chemical procedure such as immersion in a mixed solution of acetic anhydride, pyridine, and benzene.

The process described above may be repeated several times, if required; and usually, three or four repetitions of the process is sufficient. In cases where electrodepositing is repeated several times, the electrodepositing voltage may be gradually raised in the second and subsequent repetitions to form a uniform thin film of polyimide. Other modifications such as altering the concentration or composition of the electrodepositing solution may also be an effective procedure of forming a uniform thin film of polyimide.

After an insulating polymer thin film has been formed on the porous surface of the conductor in the manner described above, an electrically conductive layer as a counter electrode is formed on the insulating polymer thin film.

Examples of the method for providing a counter electrode include the formation of an electrically conductive layer composed of a metal oxide such as indium-tin-oxide or manganese dioxide; the formation of an electrically conductive layer by immersion in or application of electrically conductive paste prepared with carbon, silver, gold, or copper; the formation of an electrically conductive layer by hot-melt impregnation or application in solution form, of an electrically conductive organic material such as a TCNQ complex; the formation of an electrically conductive polymer layer by chemical oxidation polymerization; and the combination of an electrically conductive polymer layer prepared by chemical oxidation polymerization and another electrically conductive polymer layer prepared by electrolytic polymerization. From the viewpoint of close adhesion to the insulating polymer thin film and the electric conductivity, the method of forming a counter electrode from a combination of electrically conductive polymer layers prepared by chemical oxidation polymerization and electrolytic polymerization, respectively, is more suitable for the present purpose. By the use of this method, a counter electrode can be formed so as to have a configuration corresponding to the surface morphology of the insulating polymer thin film, thereby obtaining a capacitor with low leakage current, even if defects are present in the dielectric film.

The following will describe in detail the method of forming a counter electrode from a combination of electrically conductive polymer layers prepared by chemical oxidation polymerization and electrolytic polymerization, respectively.

First, a solution containing an appropriate monomer for the electrically conductive polymer at a concentration of at least 0.01 mol/liter is uniformly dispersed over the insulating polymer thin film which has previously been formed on the porous surface of the conductor, and then the conductor allowed to come into contact with a solution containing a suitable oxidizing agent at a concentration of 0.001 to 2.0 mol/liter, or conversely, a suitable oxidizing agent is first uniformly dispersed over the insulating polymer thin film and then the conductor allowed to come into contact with a solution of an appropriate monomer for the electrically conductive polymer, thereby forming an electrically conductive polymer layer by chemical oxidation polymerization and thus imparting electrical conductivity to the porous surface of the conductor. Also, another procedure of forming an electrically conductive polymer layer by chemical oxidation polymerization includes first dispersing an oxidizing agent over the insulating polymer thin film and then exposing it to a monomer in vapor form for the electrically conductive polymer.

The oxidizing agents which can be used in the chemical oxidation polymerization include halogen compounds such as iodine, bromine, bromine iodide, and periodic acid; compounds of high valence elements, compounds such as arsenic pentafluoride, antimony pentafluoride, silicon tetrafluoride, phosphorus pentachloride, phosphorus pentafluoride, aluminum chloride, molybdenum chloride, ferric chloride, permanganates, and chromates; proton acids such as sulfuric acid, nitric acid, fluorosulfonic acid, trifluoromethanesulfonic acid, and chlorosulfonic acid; oxides such as sulfur trioxide and nitrogen dioxide; salts of peroxoacid such as persulfates and perborates; and peroxides such as hydrogen peroxide and peracetic acid.

Thereafter, by the use of the electrically conductive polymer layer previously formed by chemical oxidation polymerization as an anode, electrolytic polymerization is conducted in an electrolytic solution containing a supporting electrolyte at a concentration of 0.01 to 2.0 mol/liter and a monomer for the electrically conductive polymer at a concentration of 0.01 to 5.0 mol/liter, thereby forming a uniform layer of the electrically conductive polymer on the electrically conductive polymer layer formed by chemical oxidation polymerization.

As the electrically conductive polymer, polypyrrole, polythiophene, and polyfuran can be used with polypyrrole being particularly preferred from the view point of its stability.

Examples of the supporting electrolyte which can be used are those containing an anion and a cation as recited below; the anion is an ion of halogen compound (e.g., hexafluorophosphate, hexafluoroarsenate, tetrafluoroborate, and perchlorate), a halide ion (e.g., iodide, bromide, or chloride ion), a sulfonate ion (e.g., methanesulfonate, benzenesulfonate, alkylbenzenesulfonate, naphthalenesulfonate, or alkylnaphthalenesulfonate ion, as well as a di- or tri-sulfonated compound corresponding to any one of these compounds), or an ion of boron compound (e.g., bissalicylborate), and the cation is an ion of alkali metal (e.g., lithium, potassium, and sodium), or an ammonium ion or an ion of quaternary ammonium compound (e.g., tetraalkylammonium). Specific examples of the compound which can be used as a supporting electrolyte are lithium hexafluorophosphate, lithium hexafluoroarsenate, lithium tetrafluoroborate, potassium iodide, sodium hexafluorophosphate, sodium perchlorate, sodium toluenesulfonate, tetrabutylammonium toluenesulfonate, sodium 1, 7-naphthalenedisulfonate, and tetra-ethylammonium alkylnaphthalenesulfonate.

Finally, on the surface of the element obtained above, an electrically conductive coating is formed from carbon paste and a suitable electrically conductive paste, a lead for the counter electrode is attached to a portion of this coating, and the element is sealed in a resin mold or an external case, thereby obtaining a solid capacitor of the present invention.

The solid capacitor of the present invention is characterized in that an insulating polymer thin film as a dielectric can be formed on the conductor having a porous surface in such a manner that the insulating polymer thin film can have a configuration corresponding to the surface morphology of the conductor without removing the surface irregularities of the conductor, thereby making it possible to produce a miniature nonpolar solid capacitor with excellent electrical characteristics such as high capacitance and high withstand voltage.

Moreover, after forming the insulating polymer thin film as a dielectric on the porous surface of the conductor, an electrically conductive layer as a counter electrode can be formed on the surface of the insulating polymer thin film in such a manner so as to come into close contact with the porous thin film of the insulating polymer, thereby making it possible to produce a solid capacitor with excellent electrical characteristics such as low dielectric losses and high capacitance comparable to that of conventional electrolytic capacitors.

DESCRIPTION OF THE PREFERRED EMBODIMENTS

The invention will be further explained by reference to the following examples, in which the term "parts" refers to an amount in term of parts by weight and the values of capacitance and dielectric loss were measured at a frequency of 120 Hz.

EXAMPLE 1

An etched aluminum foil with a surface roughened by a factor of 50 was obtained by electrolytic etching. After cutting the aluminum foil into a 10 mm × 3 mm strip, a lead was attached to the strip by caulking, thereby obtaining a metal electrode having a porous surface.

On the other hand, in a separate process, 3.3 parts of p-phenylenediamine (compound 7) were dissolved in 90 parts of N,N-dimethylformamide, 6.7 parts of pyromellitic dianhydride (compound 1) were added thereto, and the mixture was allowed to react at room temperature for 12 hours, thereby forming a solution of polyamic acid. Next, 1.8 parts of trimethylamine were added to the solution, and the reaction mixture was allowed to stand at 40° C. for 30 minutes, thus neutralizing a portion of the carboxyl groups of the polyamic acid and obtaining a solution of a salt of polyamic acid. To 60 parts of this solution were added 40 parts of methanol, thereby obtaining an electrodepositing solution.

The electrodepositing solution was placed in a stainless steel vessel. The metal electrode having a porous surface was immersed as an anode in this solution with the stainless steel vessel serving as a cathode, and a voltage of 150 V was applied between these electrodes for a period of 3 minutes, thereby forming a thin film of polyamic acid on the porous surface of the metal electrode. Next, the metal electrode was removed from the vessel and heated at 250° C. for 2 hours, thereby forming a polyimide film on the surface of the metal electrode.

The element so obtained was then immersed in a 2 mol/liter ethanolic solution of pyrrole for 5 minutes, after which the element was immersed in a 0.5 mol/liter aqueous solution of ammonium persulfate for 5 minutes, thereby forming a polypyrrole layer by chemical oxidation polymerization. Next, this element was immersed in an acetonitrile solution containing pyrrole monomer at a concentration of 1 mol/liter and tetraethylammonium p-toluenesulfonate as a supporting electrolyte at a concentration of 1 mol/liter, and by the use of the polypyrrole layer prepared by chemical oxidation polymerization as an anode, constant-current electrolytic polymerization was conducted for a period of 30 minutes at a current density of 1 mA/cm$^2$ with respect to an external electrode, thereby forming a polypyrrole layer by electrolytic polymerisation. Then, this element was immersed in colloidal carbon, after which silver paste was applied to form an electrically conductive coating, and a lead for the counter electrode was attached to a portion of this coating, resulting in a solid capacitor. The electrical characteristics of the capacitor so obtained are shown in the Table below.

EXAMPLE 2

In this example, a solid capacitor was produced in accordance with the procedure used in Example 1, except that 40 parts of methanol were not added to the solution of the salt of polyamic acid. The electrical characteristics of the capacitor so obtained are shown in the Table below.

EXAMPLE 3

In this example, a solid capacitor was produced in accordance with the procedure used in Example 1, except that 40 parts of acetone were added to the solution of the salt of polyamic acid in place of methanol. The electrical characteristics of the capacitor so obtained are shown in the Table below.

EXAMPLES 4–6

In these examples, solid capacitors were produced in accordance with the procedure used in Example 1, except that a porous sintered body of tantalum with a 50-fold increased effective surface area, which was obtained by sintering of tantalum particles (Example 4), a sponge material of nickel with a 30-fold increased effective surface area (Example 5), and a sponge material of stainless steel with a 30-fold increased effective surface area (Example 6), respectively, were used in place of an etched aluminum foil. The electrical characteristics of the capacitors so obtained are shown in the Table below.

EXAMPLE 7

In this example, a solid capacitor was produced in accordance with the procedure used in Example 1, except that 4.0 parts of 4,4'-diaminodiphenyl ether (compound 9) were used in place of 3.3 parts of p-phenylenediamine and 6.0 parts of biphenyltetracarboxylic dianhydride (compound 2) were used in place of 6.7 parts of pyromellitic dianhydride. The electrical characteristics of the capacitor so obtained are shown in the Table below.

EXAMPLE 8

First, a sponge material of stainless steel with a 50-fold increased effective surface area was cut into a 10 mm × 5 mm strip, and a lead was attached to the strip by caulking, thereby obtaining a metal electrode having a porous surface.

By the use of the metal electrode as an anode, electrolytic oxidation polymerization was conducted in an electrolytic solution containing 0.5M benzene, 0.1M tetrabutylammonium perchlorate as a supporting electrolyte, and phosphorus pentoxide at the saturated concentration, thereby forming a poly-p-phenylene film with a thickness of 0.3 μm on the metal electrode.

After immersing this element in a 2 mol/liter ethanolic solution of pyrrole for a period of 5 minutes, the element was removed and immersed in a 0.5 mol/liter aqueous solution of ammonium persulfate for 5 minutes, thereby forming a polypyrrole layer by chemical oxidation polymerization. Next, this element was immersed in an aqueous solution containing pyrrole monomer at a concentration of 1 mol/liter and sodium p-toluenesulfonate at a concentration of 1 mol/liter as a supporting electrolyte, and by the use of the polypyrrole layer prepared by chemical oxidation polymerization as an anode, constant current electrolytic polymerization was conducted for a period of 30 minutes at a current density of 1 mA/cm$^2$ with respect to an external electrode, thereby forming a polypyrrole layer by electrolytic polymerization. Then, this element was immersed in colloidal carbon, after which silver paste was applied to form an electrically conductive coating, and a lead for the counter electrode was attached to a portion of this coating, resulting in a solid capacitor. The electrical characteristics of the capacitor so obtained are shown in the Table below.

EXAMPLE 9

In this example, a solid capacitor was produced in accordance with the procedure used in Example 9, except that a thin film of polyacrylic acid with a thickness of 0.2 μm was used in place of the thin film of poly-p-phenylene with a thickness of 0.3 μm. The polyacrylic acid film was prepared by first electrodeposition in a 0.1M aqueous solution of polyacrylic acid by the use of a sponge material of stainless steel as an anode, and then immersing in a 0.5N aqueous solution of potassium hydroxide, followed by heat treatment at 120° C. for an appropriate period of time. The electrical characteristics of the capacitor so obtained are shown in the Table below.

COMPARATIVE EXAMPLE 1

On both surfaces of a polyethylene terephthalate film with a thickness of 3 μm, aluminum was deposited to a thickness of approximately 500 angstroms, thereby obtaining a metallized polyethylene terephthalate film. After cutting into a 10 mm×5 mm strip, a lead was attached to a portion of each side with silver paste, then the element was subjected to molding with an epoxy resin, resulting in a film capacitor. The electrical characteristics of the capacitor so obtained are shown in the Table below.

Although the rated voltage of this capacitor was 50 V, the capacitance was 0.000443 μF, thus, more than 500 times the area of the strip would be required in order to obtain the same level of capacitance as that of the solid capacitors prepared by the method of the present invention.

COMPARATIVE EXAMPLE 2

An etched aluminum foil with a surface roughened by a factor of 50 was obtained by electrolytic etching. The foil was cut into a 10 mm×3 mm strip, after which a lead was attached to the strip by caulking and the element was anodized in an aqueous solution of ammonium adipate at a voltage of 75 V, thereby forming a dielectric oxide layer.

This element was then immersed in a 2 mol/liter ethanolic solution of pyrrole for a period of 5 minutes, after which the element was immersed in a 0.5 mol/liter aqueous solution of ammonium persulfate for 5 minutes, thereby forming a polypyrrole layer by chemical oxidation polymerization. Next, this element was immersed in an aqueous solution containing pyrrole monomer at a concentration of 1 mol/liter and sodium p-toluenesulfonate as a supporting electrolyte at a concentration of 1 mol/liter, and by the use of the polypyrrole layer prepared by chemical oxidation polymerization as an anode, constant current electrolytic polymerization was conducted for a period of 30 minutes at a current density of 1 mA/cm$^2$ with respect to an external electrode, thereby forming a polypyrrole layer. Then, this element was immersed in colloidal carbon, after which silver paste was applied to form an electrically conductive coating, and a lead for the counter electrode was attached to a portion of this coating, resulting in a capacitor. The electrical characteristics of the capacitor so obtained are shown in the Table below.

The rated voltage and capacitance of the capacitor so obtained were 25 V and 2.28 μF, respectively. However, this capacitor was polar with a dielectric loss of 0.015, and was therefore inferior in these respects to the capacitors produced in accordance with the method of the present invention.

TABLE

| | Rated voltage (V) | Capacitance (μF) at 120 Hz | Dielectric loss at 120 Hz | Insulation resistance (MΩ) |
|---|---|---|---|---|
| Example 1 | 25 | 0.403 | 0.0031 | 5500 |
| Example 2 | 25 | 0.390 | 0.0085 | 3850 |
| Example 3 | 25 | 0.301 | 0.0032 | 5100 |
| Example 4 | 25 | 0.310 | 0.0039 | 5000 |
| Example 5 | 25 | 0.212 | 0.0028 | 5500 |
| Example 6 | 25 | 0.207 | 0.0029 | 5450 |
| Example 7 | 25 | 0.404 | 0.0030 | 5500 |
| Example 8 | 10 | 0.18 | 0.011 | 150 |
| Example 9 | 5 | 0.27 | 0.082 | 100 |
| Comparative Example 1 | 50 | 0.000443 | 0.003 | 30000 |
| Comparative Example 2 | 25 | 2.28 | 0.015 | 1250 |

It is understood that various other modification will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A solid, non-polar capacitor comprising an electrode formed from a conductor having a porous surface comprising surface irregularities, a dielectric layer formed from an insulating polymer thin film which is formed electrochemically on the porous surface of said conductor whereby said insulating polymer thin film conforms to said surface irregularities of said conductor, and a counter electrode formed from an electrically conductive layer on the surface of said dielectric layer.

2. A solid capacitor according to claim 1, wherein said insulating polymer thin film is a polyimide thin film formed by the use of a solution containing a salt of polyamic acid as an electrodepositing solution to form a thin film of polyamic acid on the porous surface of said conductor, after which the thin film of polyamic acid is dehydrated to polyimide.

3. A solid capacitor according to claim 1, wherein said electrically conductive layer consists of an electrically conductive polymer layer prepared by chemical oxidation polymerization and an electrically conductive polymer layer prepared by electrolytic polymerization.

4. A solid capacitor according to claim 3, wherein said electrically conductive polymer layer is made of polypyrrole.

* * * * *